(12) United States Patent
Sorsa

(10) Patent No.: US 7,398,017 B2
(45) Date of Patent: Jul. 8, 2008

(54) METHOD AND ARRANGEMENT FOR TAKING A CAMERA INTO USE IN A MOBILE DEVICE

(75) Inventor: Arto Sorsa, Muurame (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/570,718

(22) PCT Filed: Sep. 2, 2004

(86) PCT No.: PCT/FI2004/050125

§ 371 (c)(1),
(2), (4) Date: Oct. 23, 2006

(87) PCT Pub. No.: WO2005/025190

PCT Pub. Date: Mar. 17, 2005

(65) Prior Publication Data

US 2007/0065140 A1    Mar. 22, 2007

(30) Foreign Application Priority Data

Sep. 5, 2003    (FI) .................................. 20035144

(51) Int. Cl.
*G03B 17/48* (2006.01)
(52) U.S. Cl. ........................ 396/429; 396/48; 396/300

(58) Field of Classification Search ................... 396/72, 396/48, 300, 429, 434
See application file for complete search history.

(56) References Cited

U.S. PATENT DOCUMENTS

| 4,609,274 | A | * | 9/1986 | Iwashita et al. ............. 396/130 |
| 4,715,059 | A | * | 12/1987 | Cooper-Hart et al. ..... 348/14.14 |
| 5,872,433 | A | * | 2/1999 | Sakai ........................ 318/139 |
| 6,424,843 | B1 | * | 7/2002 | Reitmaa et al. ............. 455/566 |
| 2002/0122110 | A1 | * | 9/2002 | Rasanen ................. 348/14.01 |
| 2003/0236814 | A1 | * | 12/2003 | Miyasaka et al. .......... 709/102 |
| 2004/0127251 | A1 | * | 7/2004 | Thakkar et al. .......... 455/552.1 |

FOREIGN PATENT DOCUMENTS

| DE | 10315331 | 8/2003 |
| JP | 2003115911 | 4/2003 |
| JP | 2003198915 | 7/2003 |

* cited by examiner

Primary Examiner—W. B. Perkey
Assistant Examiner—Michael A Strieb
(74) Attorney, Agent, or Firm—Ware, Fressola, Van Der Sluys & Adolphson, LLP

(57) ABSTRACT

The invention relates to a method for using a mobile device camera, and particularly to implementing the camera rapidly and easily. The method according to the invention for triggering a mobile device camera (322) includes a predetermined key sequence for triggering the camera (322), so that as a response to feeding a predetermined key sequence, the camera is triggered (105, 205) irrespective of the current mode of the mobile device.

17 Claims, 3 Drawing Sheets

METHOD AND ARRANGEMENT FOR TAKING A CAMERA INTO USE IN A MOBILE DEVICE

CROSS REFERENCE TO RELATED APPLICATIONS

This application is for entry into the U.S. national phase under §371 for International Application No. PCT/FI2004/050125 having an international filing date of Sep. 2, 2004, and from which priority is claimed under all applicable sections of Title 35 of the United States Code including, but not limited to, Sections 120, 363 and 365(c), and which in turn claims priority to Finnish patent application 20035144 filed on Sep. 5, 2003.

TECHNICAL FIELD

The invention relates to a method and arrangement for using the camera of a mobile device, and particularly to a method for taking the camera into use in a quick and effortless manner.

BACKGROUND OF THE INVENTION

In a so-called camera phone, the camera may be a fixed part of the mobile device, or it may be an auxiliary accessory. These cameras are typically small-sized digital cameras. When the size of the cameras is reduced, they can be more easily integrated in smaller and smaller devices, and the cameras are available for the use of more and more users. As the quality of the cameras is improved, their fields and targets of usage become more versatile. Already at present, the camera features of a mobile device can be used professionally when producing and transmitting picture information: for instance when counting or identifying birds, pictures taken of the species in question offer a help. On the other hand, an explanatory picture of a device can be sent for instance from a factory to a dealer. An advantage in comparison with a regular camera is the small size of the device, as well as the fact that there is needed only one device, i.e. the mobile device, by means of which there can be performed both the photography, the transmission of the image and other communication connected to the situation. This makes the photography and the transmission of pictures more rapid—and in many cases it is the prerequisite for said processes—because separate devices and conversion programs are not needed.

When a picture should be taken by the camera of a mobile device, the camera function must first be started. When the mobile device is in normal mode, so that the keys are in use and the rest of the applications are turned off, the camera function can be started. Generally the camera function is started so that in the mobile device menu, there is searched the camera function, said function is selected and accepted to be activated. When the camera function is started, it is ready to be used, and the user can capture desired targets in digital picture files that are recorded in the memory unit of the mobile device. The memory unit may contain a certain area, a so-called picture archive sector, where the picture files made of the pictures taken by the mobile device camera are recorded. The mobile device may also include a separate memory unit for picture files storing digital pictures.

According to the prior art, a mobile device camera can be used for many types of photography. A small-size and light-weight camera is very useful in special conditions, where separate devices need not be provided in addition to the mobile device camera. In particular, a mobile device camera is useful if the pictures should be immediately sent to another device, because the pictures can also be transmitted by the same device, and they need not be transferred nor converted. A drawback in a mobile device camera application is that the camera functions are slow when they are being started and taken into use. The searching, selecting and activating of the camera application takes so much time that rapidly changing or passing situations cannot be captured, unless the camera application already is switched on, and the camera is in a standby mode. In addition, the time required for switching the camera application on depends on the current mode of the mobile device.

For instance when watching birds and writing statistics of the species, it is important to recognize the various species. The recognition can easily be ensured by saving the picture of the detected species, and by later comparing the picture with one found in a bird book or by sending the picture to a specialist. From a description based on human memory alone, the recognition of the species later on is remarkably more unreliable. In order to obtain a picture of a given bird species, other species or an otherwise moving target requires rapid shooting, which is not possible with the devices of the prior art.

SUMMARY OF THE INVENTION

The objective of the invention is to enable the capturing of rapidly changing situations by a mobile device camera. Another objective is to make the implementation of a mobile device camera more rapid. Yet another objective of the invention is to make the use of a mobile device camera more versatile.

The objectives are achieved so that the triggering of the mobile device camera is realized by means of a key sequence.

The invention is characterized by what is set forth in the characterizing parts of the independent claims. Embodiments of the invention are described in the dependent claims.

In embodiments there is presented a method for triggering a mobile device camera (322), wherein the mobile device includes a predetermined key sequence for triggering the camera, and as a response to feeding the predetermined key sequence (102, 202), the camera is triggered (105, 205) irrespective of the current mode of the mobile device, and as a response to feeding the predetermined key sequence (102, 202) an application or a function active at the moment are put on hold, while the camera application triggered by the key sequence is deactivated. According to embodiments there is presented also an arrangement for triggering a mobile device camera (322), wherein the mobile device is provided with a predetermined key sequence for triggering the camera, means for detecting the feeding of said key sequence (301, 323) and means for triggering (307) the camera (322) irrespective of the current mode of the mobile device as a response to detecting the predetermined key sequence, and the mobile device includes means for putting on hold an application or a function active at the moment of detecting the predetermined key sequence, until the camera application triggered by the predetermined key sequence is deactivated.

According to an embodiment of the invention, a mobile device is provided with a predetermined key sequence for triggering the camera, and as a response to feeding the predetermined key sequence, the camera application is started, and the camera is triggered irrespective of the current mode of the mobile device. For triggering the camera in order to take a picture, there is defined a given key sequence, so that for example the pressing of two keys successively results in the starting of the camera application and the triggering of the camera. When the predetermined key sequence is fed in the mobile device, the camera application is started and the camera triggered irrespective of whether some other application, function or setting that restricts the functions is currently active in the mobile device. According to an embodiment the currently active function, application or alike is put on hold during the photographing triggered by the predetermined key sequence.

When a picture is taken by the mobile device camera according to an embodiment, by using a predetermined key sequence, the camera application is according to an embodiment active and ready to be used in the normal fashion. In case any other application, program or function was interrupted for the duration of taking a picture according to an embodiment, the interrupted application, program or function remains in the background, until the user switches the camera application off, returns to the earlier function and continues operation from where it was left when feeding in the key sequence. This kind of temporary interruption of a program, function or alike is typically referred as "put on hold".

According to embodiments of the invention, the mobile device camera can be triggered extremely rapidly. This enables the perpetuating of rapidly changing or moving targets and situations. According to embodiments, immortalizing of changing situations is enabled such that currently active application is not disturbed. The user returns to current application after the rapid picture is taken and the camera application closed. Thus a small-size camera that is moved along with the mobile device becomes even more feasible. In addition, the pictures taken by using the fast key sequence can be transmitted to other devices immediately, without auxiliary accessories, within the coverage area of the mobile network.

BRIEF DESCRIPTION OF THE DRAWINGS

In following the invention is described in more detail with reference to the appended drawings, where.

DETAILED DESCRIPTION

Figure 1:
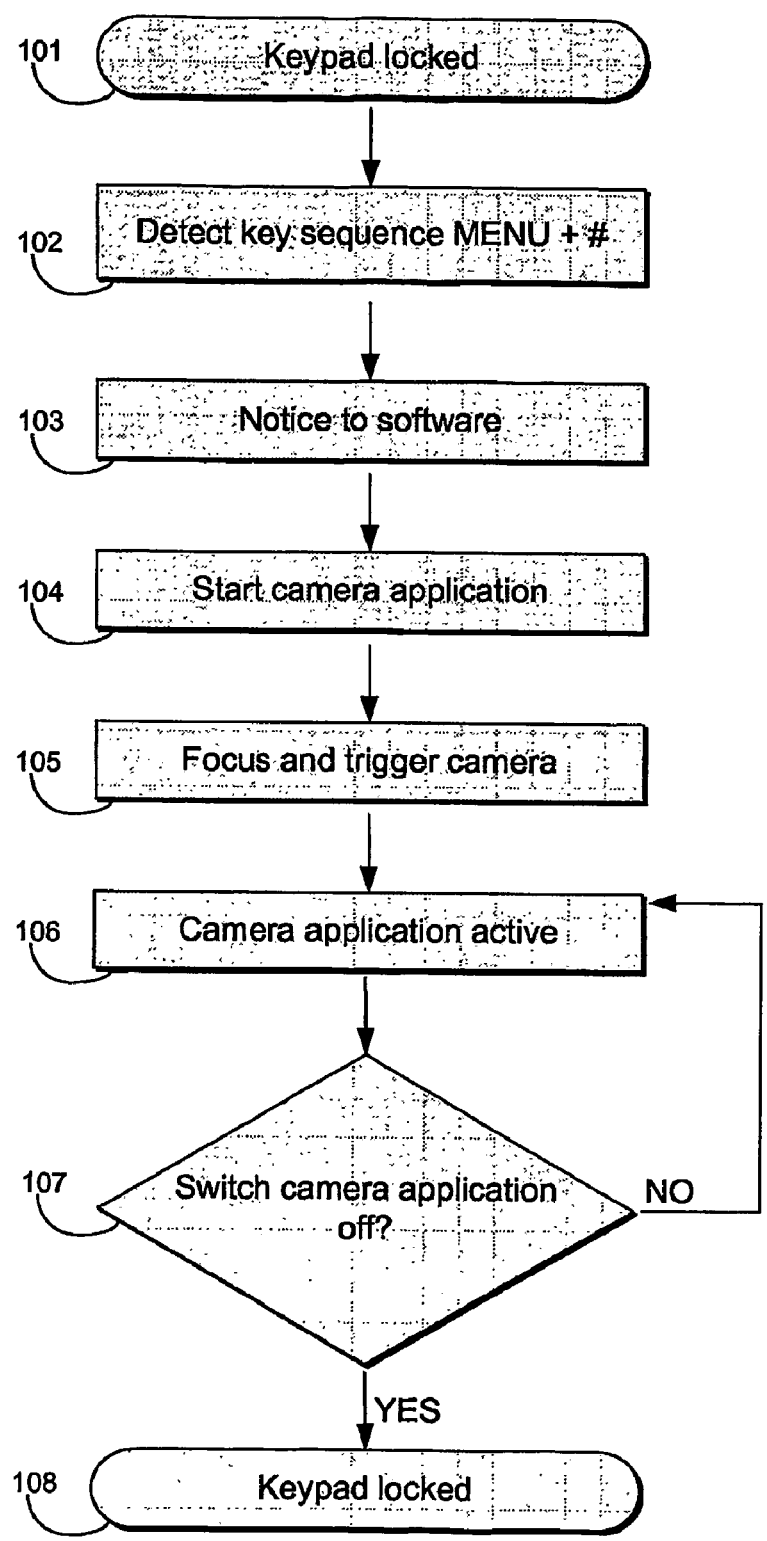
FIG. 1 illustrates a method according to an embodiment of the invention.

FIG. 1 illustrates a method according to an embodiment of the invention for taking a picture rapidly by means of a mobile device camera. In this embodiment, the mobile device is first in a normal standby mode, keypad locked in step 101. In step 102, in the mobile device there is fed a predetermined key sequence, which in this embodiment is defined so that the first input is a stroke of the MENU key, and the second input is the stroke of the #key. In this embodiment, said two keystrokes must be fed successively in said order. In step 102, as a result of detecting the predetermined key sequence, the mobile device bypasses the current settings and definitions, in this embodiment the locking of the keypad, and in step 103 there is transmitted, for the software controlling the operation, notice that the defined key sequence is fed in the mobile device. The software controlling the camera function can operate irrespective of other definitions, so that it is priorized higher than for example other programs or definitions, or it can be given the right to bypass other definitions as a response to feeding the predetermined key sequence. According to an embodiment, functions that are active when the predetermined key sequence is fed in, are put on hold as a response to feeding the predetermined key sequence. Thus the currently active functions, put on hold, are returned just as they were after the camera application activated by the predetermined key sequence is deactivated, i.e. closed.

Typically the software first controls the currently active function or application to be put on hold. The software controlling the camera function transmits commands to the camera controller or driver so that in step 104, as a response to feeding the predetermined key sequence, the mobile device camera application is started and the camera is triggered in order to make a picture in step 105. According to one embodiment, the camera is automatically focused in step 105, before taking the picture. Thus the shooting function that was activated by the key sequence produces a picture that is as sharp and as high-quality as the one that would be normally taken with the camera. In step 105, the camera is used for taking a recordable, digital-form picture as a response to detecting the predetermined key sequence fed in by the user.

When the camera is triggered as a response to feeding in the predetermined key sequence, the mobile device camera application is active and can be used normally in step 106. In step 107 it is checked whether the user wishes to switch off the active camera application. In case the user does not wish to switch off the camera application, but he wishes to continue using the camera, step 106 is resumed, in which case the camera is in standby mode, and it can be used for taking pictures normally. If the camera application is decided to be switched off in step 107, the camera application is switched off, and the mobile device function returns to the same mode, function and settings where it was in step 101, i.e. in this embodiment in step 108 the mobile device returns to the normal standby mode, where the keypad is locked. Any function or application put on hold is returned after deactivation of the camera application.

The key sequence according to an advantageous embodiment of the invention can be defined in many different ways. The defined detailed key sequence does not have any essential significance for the invention, as long as the defined key sequence is not one that already has been assigned for a certain function in the mobile device. For instance the key sequence MENU and * is typically reserved for a function that locks the keypad and respectively opens it, wherefore precisely this key sequence is not available. According to an embodiment, the predetermined key sequence is defined by two keys and realized by activating said keys in a given order. The key sequence is typically defined by two keys, because it is sufficiently fast and easy to feed in, but yet it is not very easily struck by accident. A key sequence including only one keystroke, or a key sequence realized by striking the same key twice, are both possible, but the probability that they should be struck accidentally is already much higher than the probability of striking two separate keys successively by accident. Typically the interval between pressing the key sequence strokes is 0.5-2 seconds. In some embodiments it can be defined that the keys must be pressed simultaneously, or that the first key can still be pressed down when the next key is being pressed. In case the interval between the keystrokes is longer than what is defined, the input is not considered as a function-activating key sequence, but just as a normal striking of two separate keys in succession.

As a response to feeding in a predetermined key sequence, the control unit controlling the operation in the mobile device bypasses the rest of the prevailing mobile device definitions and settings that define the mobile device state, user profile, usage environment, mode, functions and so on. These remain in the background as they were at the moment when the key sequence was fed in, and the control unit grants functional rights to a program or software according to an embodiment of the invention. That is, any active application, function, mode or alike is set in state hold in background. According to one embodiment of the invention, the mobile device is provided with a program or software having a controller for starting the camera application and for triggering the camera according to the embodiment of the invention. Other applications or functions currently active in the mobile device at the moment when the key sequence is fed in are interrupted or so to say frozen in the background, so that they are not switched off, but they do not proceed/function; they maintain the interrupted mode until the camera application that was activated by the key sequence is switched off. When the camera application is switched off, there is resumed the state, function, application or mode that was active when the key sequence was fed in. The state, function, application or mode put on hold is resumed, i.e. the state hold is deactivated.

Figure 2:
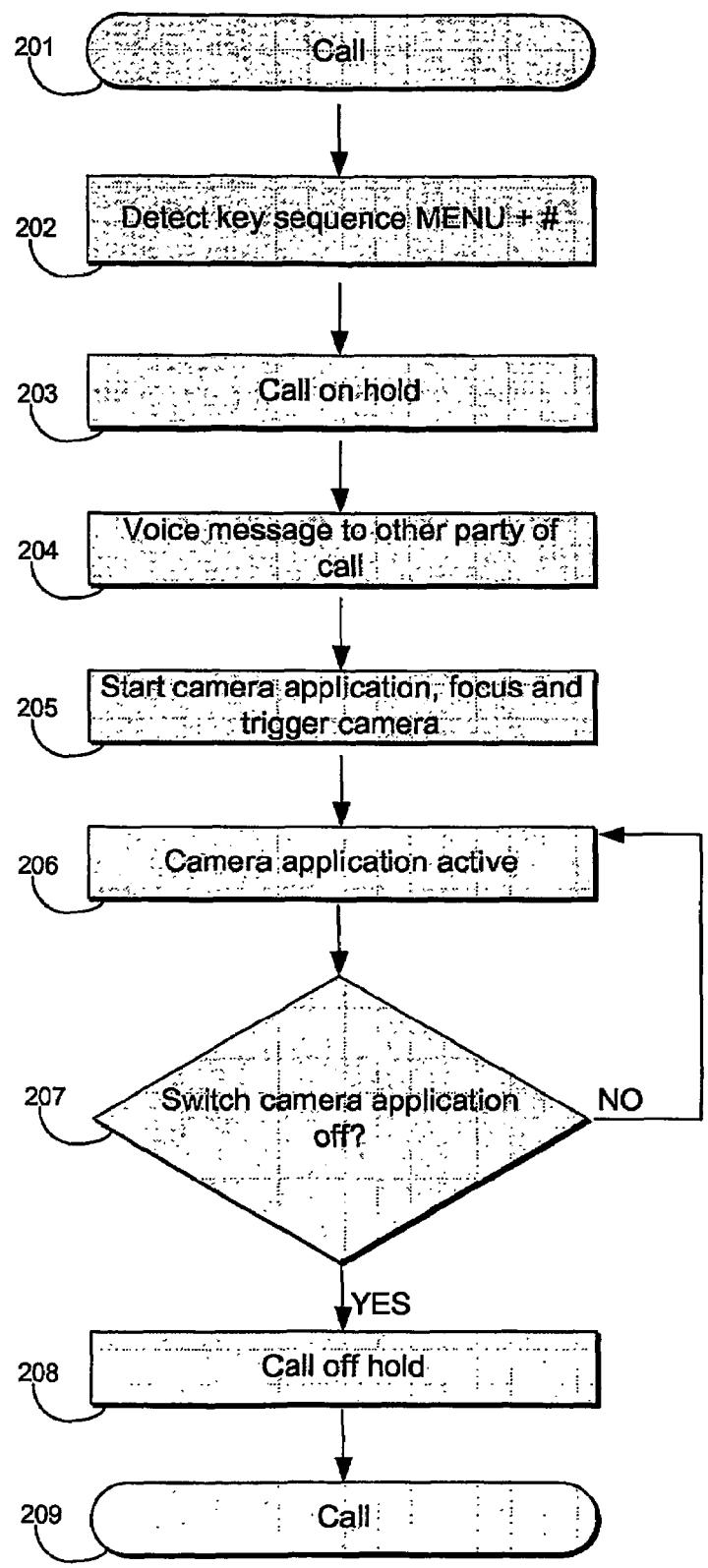
FIG. 2 illustrates a method according to an embodiment of the invention.

FIG. 2 illustrates the fast triggering of a camera according to an embodiment of the invention in a mobile device that at the moment of triggering the camera has a speech connection with another device. In step 201 the mobile device user is speaking on the phone, i.e. the mobile device has established a speech connection in a known way with another device. In the middle of the call, the user detects a target or situation to be captured and decides to record it in the mobile device. The user feeds in the predetermined camera-triggering key sequence, which in this embodiment is MENU-#. The predetermined key sequence is detected in the mobile device in step 202. The feeding of the key sequence results in that the active call is put on hold in step 203. Respectively, a call can be put on hold for instance when there is received a new call during an already established call connection. According to an embodiment, the mobile device that interrupts the call sends in step 204 a voice message that informs the other party of the situation. The voice message may simply say that the speaker will be back soon or ask to wait for a moment.

As a response to detecting the key sequence, in the mobile device there is activated the camera application in step 205. Immediately after starting the camera application, a picture is taken, i.e. the camera is triggered. According to one embodiment, the camera is provided with a zoom lens by which the desired angle of view can be defined prior to taking the picture. In addition, the camera is typically focused before shooting. The focusing and zooming are performed automatically prior to the fast triggering according to an embodiment of the invention. When the picture is taken, the camera function is normally available in step 206. In step 207 it is checked whether the camera application should be switched off. In case the camera application is not switched off, the camera application is normally available according to step 206. If the camera application is switched off in step 207, the putting on hold of the call in step 203 is cancelled, and said speech connection is returned to the original normal speech connection in step 208. In step 209 we are back in the same speech connection as earlier in step 201, and the call can be continued normally.

By using the key sequence defined according to embodiments of the invention, the camera application can be activated and the camera triggered irrespective of the current mode of the mobile device. The keypad of the mobile device may be locked, there may be a speech connection, another data transmission connection, another application or function going on, or the mobile device may be in any possible mode. The active application may be for instance a game, a calendar, a video recording, editing of a MMS (multimedia messaging service) message or any other application that is available in the mobile device or that can be loaded therein. According to the embodiments of the invention, by feeding a predetermined key sequence, the ongoing function or application is interrupted, i.e. put on hold, the camera function is activated, and the camera is triggered immediately. Afterwards the interrupted function or application put on hold is resumed to continue from the same state and phase it was in at the time of interruption.

Figure 3:
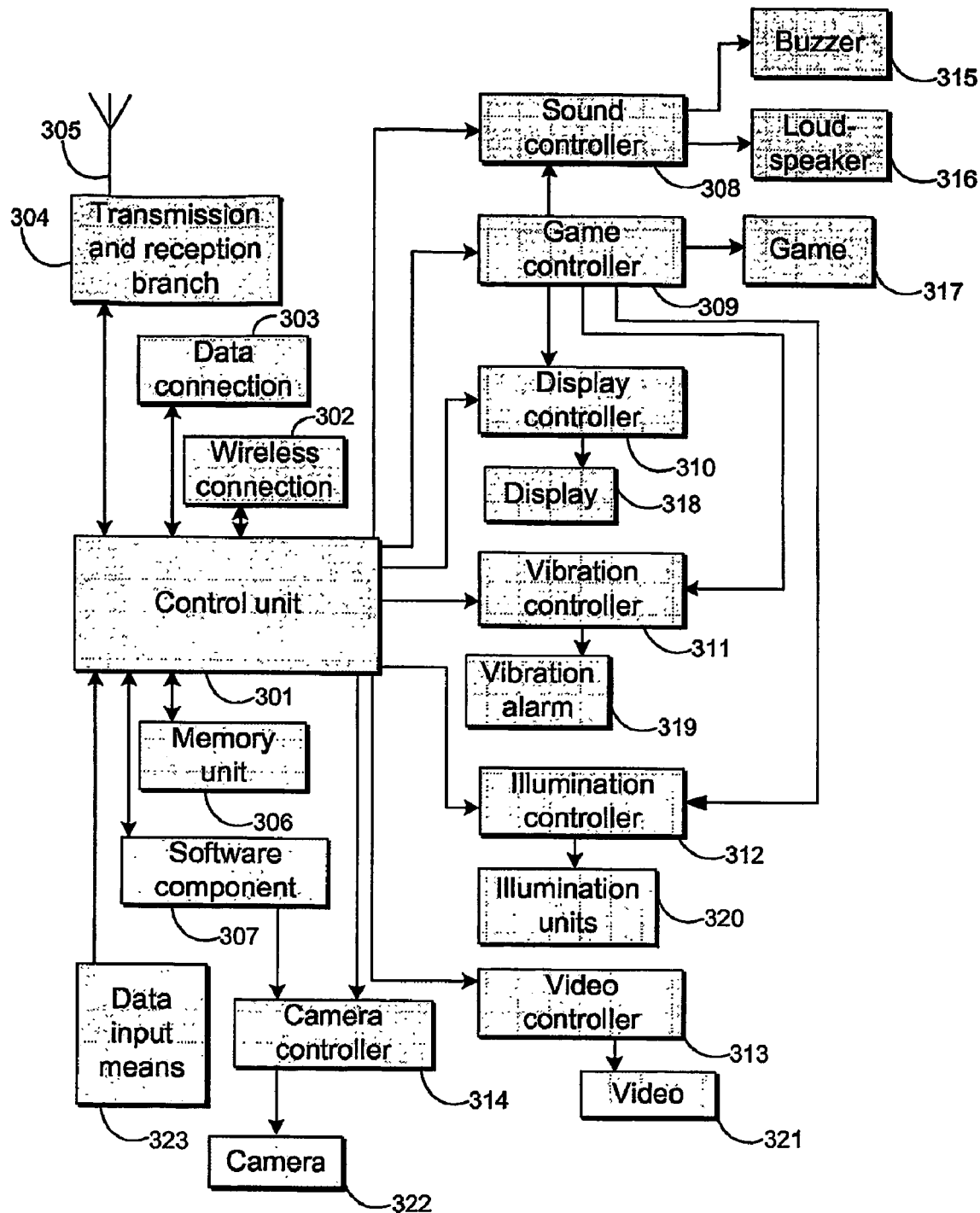
FIG. 3 illustrates a mobile device according to an embodiment of the invention.

A mobile device according to an embodiment of the invention is illustrated in FIG. 3. The mobile device comprises a control unit 301 that takes care of all functions of the device and controls them. The control unit 301 also contains circuits for processing and handling data. All units and components of the mobile device are connected to the control unit 301 directly or through their specific controllers. The mobile device may be in contact with other devices and transmit data through a wireless connection 302 that can be for example a short-range infrared or bluetooth interface. Through the data connection 303, data can be transmitted, typically by intermediation of a cable, to other devices. By means of a transmission and reception branch 304, there is typically established radio connection with other devices by air via the antenna 305.

The mobile device illustrated in FIG. 3 includes a memory unit 306, in which data can be stored. For instance the key sequence defined according to the embodiments of the invention is generally stored in the memory unit 306, where it is available for the control unit 301. Thus, according to the methods described in embodiments of the invention, in the mobile device there can be saved a predetermined key sequence for triggering the camera. Moreover, the mobile device is provided with data input means 323. Typically the mobile device is provided at least with a keypad for feeding in data, and in this case particularly the key sequence. Data can be fed in and the key sequence can also be defined by other means, such as for instance a mouse, a touch panel, a pencil, a microphone receiving voice input, and other corresponding input devices. The key sequence according to embodiments of the invention may mean for example a given type of voice input that the mobile device recognizes as predetermined on the basis of a sample recorded in the memory unit 306. Typically the control unit 301 or the controller of the data input device 323 checks at given intervals whether data is fed in by the data input device. When an input is detected, it is transmitted to the control unit 301, which processes detected input and/or transmits it further to other units or components.

In FIG. 3, there are by way of example illustrated some application and function sections of a mobile device. The mobile device is provided with a buzzer 315 and a loudspeaker 316 for producing sound, and a sound controller 308 for controlling the sound units. In addition, the mobile device may include for instance a MIDI (musical instrument digital interface) unit for producing more versatile sounds. The mobile device includes game applications 317 and a controlling game controller 309, a display 318 and a display controller 310, a vibrator alarm 319 and a vibration controller 311, illumination units 320 and an illumination controller 312. Typically the game controller 309 may control for example the sound controller 308, the display controller 310, the vibration controller 311 and the illumination controller 312. In addition, the mobile device illustrated in FIG. 3 includes a video unit 321 for continuously recording moving image and a video controller 313 for controlling the functions of the unit.

The mobile device illustrated in FIG. 3 is provided with a camera 322 and a camera control unit 314 for controlling the camera functions. Moreover, the mobile device is provided with a software component 307 that is activated by the control unit 301 as a response to detecting a given predetermined key sequence. In the software component 307, there are recorded orders and commands and defined the functions that are performed as a response to detecting the predetermined key sequence, irrespective of the current mode of the mobile device, and irrespective of the settings or the mode. Typically any current settings, modes, functions, operations, applications etc. are put on hold as a response to detecting the predetermined key sequence. Typically the software component 307 includes the definitions and the mobile device is provided with the means for interrupting the application or function that is currently active at the moment of detecting the key sequence. The software component 307 may direct the command directly to the camera control unit 314, which further controls the functions of the camera 322, or the software component 307 may transmit the commands to the camera controller 314 via the control unit 301, which takes care of other measures that are possibly necessary, such as the putting of other functions in the background as interrupted. Typically in the software component 307 there also is defined that the camera function 322 is maintained ready to use and active after the camera 322 is triggered as a response to detecting the key sequence. In the mobile device, the control unit 301 takes care that the camera function 322 stays active and that the possibly interrupted functions remain in their temporary interrupted, i.e. on hold, state. The control unit 301 may also control for instance the transmission of a voice message to the other party of a call that was put on hold. As for the camera controller 314, it checks for example that the camera is automatically focused before triggering it as a response to detecting the key sequence. Typically the software component 307 of the mobile device is a new program with a separate controller. According to one embodiment, the software component 307 is an application program with a separate controller for controlling the application program and for transmitting the command thereof to other units and controllers.

What is claimed is:

1. A method for triggering a mobile device camera, wherein the mobile device includes a predetermined key sequence for triggering the camera, and as a response to feeding the predetermined key sequence, the camera is triggered irrespective of the current mode of the mobile device, wherein as a response to feeding the predetermined key sequence an application or a function active at the moment is put on hold, until the camera application triggered by the key sequence is deactivated.

2. The method according to claim 1, wherein the predetermined key sequence is defined by two keys and realized by activating said keys in a given order.

3. The method according to claim 1, wherein as a response to feeding the predetermined key sequence, the camera application is activated, and the camera is triggered for producing a picture.

4. The method according to claim 1, wherein when the camera is triggered as a response to feeding the predetermined key sequence, the mobile device camera function is remaining active and usable normally.

5. The method according to claim 1, wherein as a response to feeding the predetermined key sequence, other current definitions and settings of the mobile device are bypassed, the camera application is activated and the camera is triggered.

6. The method according to claim 1, wherein as a response to feeding the predetermined key sequence, the application or function currently active in the mobile device is interrupted, the camera application is activated and the camera is triggered.

7. The method according to claim 1, wherein the camera is focused automatically before triggering the camera as a response to feeding the predetermined key sequence.

8. An arrangement for triggering a mobile device camera, wherein the mobile device is provided with a predetermined key sequence for triggering the camera, means for detecting the feeding of said key sequence and means for triggering the camera irrespective of the current mode of the mobile device as a response to detecting the predetermined key sequence, wherein the mobile device includes means for putting on hold an application or a function active at the moment of detecting the predetermined key sequence, until the camera application triggered by the predetermined key sequence is deactivated.

9. The arrangement according to claim 8, wherein the mobile device is provided with a keypad for defining the predetermined key sequence by two keys and for feeding the key sequence.

10. The arrangement according to claim 8, wherein the arrangement is provided with means for activating the camera application and for triggering the camera in order to produce a picture as a response to detecting the feeding of the predetermined key sequence.

11. The arrangement according to claim 8, wherein the arrangement is provided with means for activating the camera application as a response to detecting the key sequence and means for remaining the camera application ready for use after the camera is triggered as a response to detecting the key sequence.

12. The arrangement according to claim 8, wherein the arrangement includes means for activating the camera function and for triggering the camera as a response to detecting the key sequence irrespective of the current state, settings or mode of the mobile device.

13. The arrangement according to claim 8, wherein the arrangement includes means for activating the camera function and for triggering the camera, and means for interrupting the presently active application or function as a response to detecting the key sequence.

14. The arrangement according to claim 8, wherein the arrangement includes means for focusing the camera automatically prior to triggering the camera as a response to detecting the key sequence.

15. The arrangement according to claim 8, wherein the device means are software means.

16. A method for triggering a mobile device camera comprising:
   providing a predetermined key sequence to the mobile device for triggering the camera;
   triggering the camera irrespective of the current mode of the mobile device in response to feeding the predetermined key sequence to the mobile device;
   putting on hold an application or a function active at the moment upon response to feeding the predetermined key sequence functions to the mobile device while the camera application is triggered by the key sequence until the camera application triggered by the key sequence is deactivated.

17. An arrangement for triggering a camera of a mobile device comprising:
   a detector configured to detect a predetermined key sequence;
   a trigger in cooperative engagement with the detector configured to respond to the detection of said predetermined key sequence and configured to trigger a camera application irrespective of the current mode of the mobile device; and
   a hold mechanism configured to put on hold an application or a function upon detection of said predetermined key sequence until the camera application triggered by detection of said predetermined key sequence is deactivated.

* * * * *